(12) United States Patent
Yu et al.

(10) Patent No.: US 8,331,670 B2
(45) Date of Patent: Dec. 11, 2012

(54) METHOD OF DETECTION DOCUMENT ALTERATION BY COMPARING CHARACTERS USING SHAPE FEATURES OF CHARACTERS

(75) Inventors: Songyang Yu, Foster City, CA (US); Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 69 days.

(21) Appl. No.: 13/053,618

(22) Filed: Mar. 22, 2011

(65) Prior Publication Data

US 2012/0243785 A1 Sep. 27, 2012

(51) Int. Cl.
*G06K 9/34* (2006.01)

(52) U.S. Cl. ...... 382/173; 358/1.18; 358/3.28; 375/240; 382/100; 382/103; 382/112; 382/124; 382/151; 382/166; 382/176; 382/190; 382/199; 382/201; 382/203; 382/209; 382/218; 382/224; 382/243; 382/305; 600/437; 702/153; 702/95; 715/764; 726/1

(58) Field of Classification Search .................. None
See application file for complete search history.

(56) References Cited

U.S. PATENT DOCUMENTS

| | | | | | |
|---|---|---|---|---|---|
| 5,933,523 | A | * | 8/1999 | Drisko et al. | 382/151 |
| 6,035,066 | A | * | 3/2000 | Michael | 382/203 |
| 6,061,478 | A | * | 5/2000 | Kanoh et al. | 382/305 |
| 6,104,834 | A | * | 8/2000 | Hull | 382/209 |
| 6,289,108 | B1 | * | 9/2001 | Rhoads | 382/100 |
| 6,473,717 | B1 | * | 10/2002 | Claussen et al. | 702/153 |
| 6,560,281 | B1 | * | 5/2003 | Black et al. | 375/240 |
| 6,731,800 | B1 | * | 5/2004 | Barthel et al. | 382/176 |
| 7,394,573 | B1 | * | 7/2008 | Goldberg et al. | 358/3.28 |
| 7,783,108 | B2 | * | 8/2010 | Aoyagi | 382/176 |
| 7,876,471 | B2 | * | 1/2011 | Tojo | 358/1.18 |
| 7,965,894 | B2 | * | 6/2011 | Tian et al. | 382/218 |
| 8,000,528 | B2 | * | 8/2011 | Ming et al. | 382/173 |
| 2003/0182072 | A1 | * | 9/2003 | Satoh et al. | 702/95 |
| 2003/0198386 | A1 | * | 10/2003 | Luo | 382/199 |
| 2005/0190981 | A1 | * | 9/2005 | Fan et al. | 382/243 |
| 2006/0072830 | A1 | * | 4/2006 | Nagarajan et al. | 382/224 |
| 2006/0109515 | A1 | * | 5/2006 | Zhao et al. | 358/3.28 |
| 2006/0262962 | A1 | * | 11/2006 | Hull et al. | 382/103 |
| 2006/0262976 | A1 | * | 11/2006 | Hart et al. | 382/190 |

(Continued)

OTHER PUBLICATIONS

Huttenlocker et al., "Comparing Images Using the Hausdorff Distance," IEEE Transactions on Pattern Analysis and Machine Intelligence, vol. 15, No. 9 (Sep. 1993).*

*Primary Examiner* — Tsung-Yin Tsai
(74) *Attorney, Agent, or Firm* — Chen Yoshimura LLP

(57) ABSTRACT

A document alteration detection method compares a target image with an original image by comparing character shape features without actually recognizing the characters. Bounding boxes for the characters are generated for both images, each enclosing one or more connected groups of pixels of one character. The bounding boxes in the original and target images are matched into pairs. Addition and deletion of text is detected if a bounding box in one image does not have a matching one in the other image. Each pair of bounding boxes is processed to compare their shape features. The shape features include the Euler numbers of the characters, the aspect ratio of the bounding boxes, the pixel density of the bounding boxes, and the Hausdorff distance between the two characters. The two characters are determined to be the same or different based on the shape feature comparisons.

38 Claims, 2 Drawing Sheets

U.S. PATENT DOCUMENTS

| | | | |
|---|---|---|---|
| 2007/0047781 A1* | 3/2007 | Hull et al. | 382/124 |
| 2007/0081694 A1* | 4/2007 | Ryan, Jr. | 382/100 |
| 2008/0031524 A1* | 2/2008 | Wenzel | 382/209 |
| 2008/0216149 A1* | 9/2008 | Rhoads | 726/1 |
| 2008/0310736 A1* | 12/2008 | Chattopadhyay et al. | 382/218 |
| 2009/0067709 A1* | 3/2009 | Gross et al. | 382/166 |
| 2009/0074299 A1* | 3/2009 | Wenzel | 382/203 |
| 2009/0169050 A1* | 7/2009 | Wolter et al. | 382/100 |
| 2010/0081931 A1* | 4/2010 | Destrempes et al. | 600/437 |
| 2010/0329576 A1* | 12/2010 | Tian et al. | 382/218 |
| 2011/0158483 A1* | 6/2011 | Ming et al. | 382/112 |
| 2012/0072859 A1* | 3/2012 | Wang et al. | 715/764 |
| 2012/0076422 A1* | 3/2012 | Yang et al. | 382/201 |
| 2012/0120453 A1* | 5/2012 | Yu et al. | 358/3.06 |

* cited by examiner

S11 — Obtain original image and target image

S12 — Pre-process original image and target image

S13 — Generate bounding boxes for characters in original image and target image

S14 — Detect deletion and addition of text based on non-matching bounding boxes

S15 — Compare shape features of pairs of matching bounding boxes in original image and target image to detect alterations S16 — Combine detection results to generate a representation of alteration detection result

Fig. 1

 Fig. 3a

 Fig. 3b

METHOD OF DETECTION DOCUMENT ALTERATION BY COMPARING CHARACTERS USING SHAPE FEATURES OF CHARACTERS

BACKGROUND OF THE INVENTION

1. Field of the Invention

This invention relates to a method of detecting alterations in a target document with respect to an original document, and in particular, it relates to such an alteration detection method that uses shape features of characters to detect alteration.

2. Description of Related Art

A closed-loop process refers to printing an original digital document (which may include text, graphics, images, etc.), using the printed hardcopy of the document such as distributing it, copying it, etc., and then scanning a hardcopy of the document back into digital form. Authenticating a scanned digital document refers to determining whether the scanned document is an authentic copy of the original digital document, i.e., whether the document has been altered while it was in the hardcopy form. Various types of document authentication and alteration detection methods have been proposed. A goal in many document authentication methods is to detect what the alterations (additions, deletions) are. One type of document authentication method performs an image comparison of the scanned document with the original digital document. This is sometimes referred to as a pixel-based alteration detection method. In another type of document authentication method, data representing or relating to the document content are encoded in barcodes, and the barcodes are printed on the document itself to assist in document authentication later.

In conventional pixel-based alteration detection methods, the original digital image and the scanned image (target image) are compared pixel-by-pixel to determine whether there are alterations in the scanned image. The high spatial resolution of both the printer and the scanner result in high resolution scanned images. Exhaustive image comparison processing of the whole image in a conventional alteration detection method is computationally intensive.

Further, pixel-based image comparison sometimes generates false positive detections. For example, for two characters located at the same locations of the original image and the target image, even when the two characters are the same (i.e. the character has not been altered), pixel level differences can exist between the target image and the original image. Such pixel level differences, which are introduced due to the printing and scanning processes that produced the target document, can result in false positive detections of alterations.

SUMMARY

The present invention is directed to an improved method for authenticating a document by performing an image comparison of the scanned document image with the original digital document image.

An object of the present invention is to provide an alteration detection method based on image comparison that reduces false positive detections.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing apparatus for detecting alterations between an original image and a target image, the original and target images being binary bitmap images, the method including: (a) defining a plurality of bounding boxes in the original image and the target image, each bounding box enclosing one or more connected groups of pixels of one character; (b) identifying a plurality of matching pairs of bounding boxes in the original image and the target image, wherein each matching pair of the bounding boxes have substantially the same locations in the original image and the target image, respectively; (c) for each matching pair of bounding boxes: (c1) calculating a plurality of shape features including (1) a Euler number of each of the pair of characters enclosed by the pair of bounding boxes, (2) an aspect ratio of each of the pair of bounding boxes, (3) a pixel density for each of the pair of bounding boxes, wherein a pixel density of a bounding box is defined as a number of pixels belonging to the character of the bounding box divided by a total number of pixels of the bounding box, and (4) a Hausdorff distance between the pair of characters; and (c2) determining whether the pair of characters enclosed by the pair of bounding boxes are the same character or different characters by evaluating (1) whether the Euler numbers of the pair of characters are equal, (2) whether a difference between the aspect ratios of the pair of bounding boxes is smaller than a first predefined threshold, (3) whether a difference between the pixel densities of the pair of bounding boxes is smaller than a second predefined threshold, and (4) whether the Hausdorff distance between the pair of characters is smaller than a third predefined threshold.

In one example, step (c2) includes: determining the pair of characters to be the same character if (1) the Euler numbers of the pair of characters are equal, (2) the difference between the aspect ratios of the pair of bounding boxes is smaller than the first predefined threshold, (3) the difference between the pixel densities of the pair of bounding boxes is smaller than the second predefined threshold, and (4) the Hausdorff distance between the pair of characters is smaller than the third predefined threshold; and otherwise determining the pair of characters to be different characters.

In another aspect, the present invention provides a method implemented in a data processing apparatus for comparing two characters in an original image and a target image, respectively, the original and target images being binary bitmap images, each character being one or more connected groups of pixels enclosed in a respective bounding box, the method including: (a) calculating a plurality of shape features including (1) a Euler number of each of the pair of characters enclosed by the pair of bounding boxes, (2) an aspect ratio of each of the pair of bounding boxes, (3) a pixel density for each of the pair of bounding boxes, wherein a pixel density of a bounding box is defined as a number of pixels belonging to the character of the bounding box divided by a total number of pixels of the bounding box, and (4) a Hausdorff distance between the pair of characters; and (b) determining whether the pair of characters enclosed by the pair of bounding boxes are the same character or different characters by evaluating (1) whether the Euler numbers of the pair of characters are equal, (2) whether a difference between the aspect ratios of the pair of bounding boxes is smaller than a first predefined threshold, (3) whether a difference between the pixel densities of the pair of bounding boxes is smaller than a second predefined threshold, and (4) whether the Hausdorff distance between the pair of characters is smaller than a third predefined threshold.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

BRIEF DESCRIPTION OF THE DRAWINGS

FIG. 1 is a flow chart illustrating an alteration detection method according to an embodiment of the present invention.

FIG. 3a depicts two bounding boxes each containing a character.

FIG. 3b depicts two skeletons generated from the two characters shown in FIG. 3a.

DETAILED DESCRIPTION OF PREFERRED EMBODIMENTS

Figure 2:
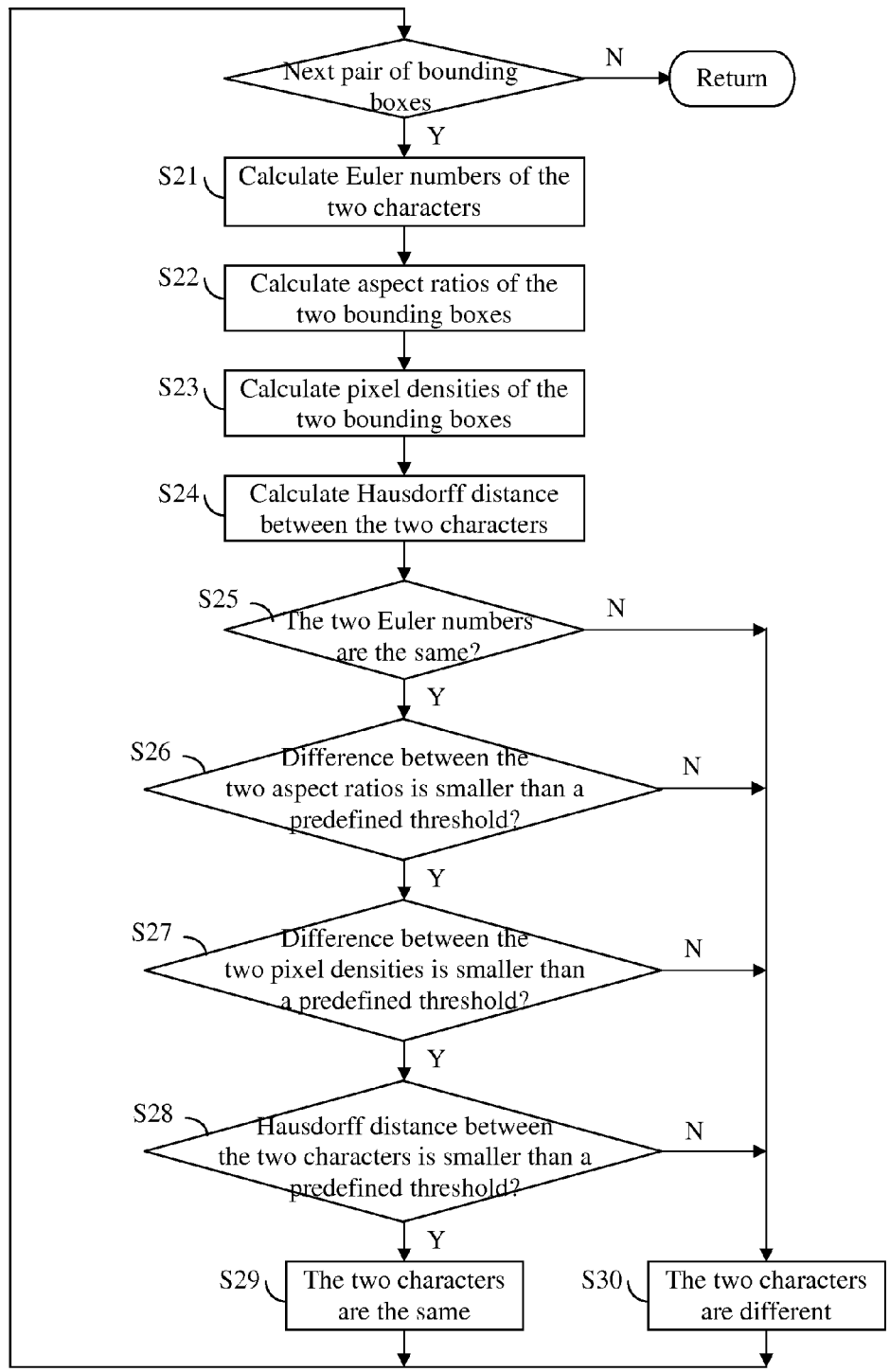
FIG. 2 is a flow chart further illustrating the shape feature comparison step in the process of FIG. 1.

According to embodiments of the present invention, a document alteration detection method compares a scanned digital document image (the target image) with an original digital document image using character shape feature comparison. Two characters in the target image and original image are determined to be the same characters or different characters by analyzing various character shape features without actually recognizing the characters. In other words, character recognition (i.e. recognizing a character as a particular character in a particular language) is not necessary.

The alteration detection method is described in more detail with reference to FIGS. 1 and 2. FIG. 1 is a flow chart illustrating an alteration detection method according to an embodiment of the present invention. FIG. 2 is a further illustration of step S15 of FIG. 1.

First, the raw original image and the raw target image are obtained (step S11). Both images are bitmap images. Typically, the raw target image is obtained by scanning a hardcopy of a document, which was originally printed from an original digital document. For example, the original digital document may be a document generated by a word processing application by a computer, an image obtained by scanning a hardcopy, a picture taken by a camera, etc. After the original digital document is printed, the hard copy may be circulated, photocopied, etc., before it is scanned back to generate the raw target image. The goal of the authentication or alteration detection process in a certain embodiment is to detect whether the hardcopy document has been altered between the time it was originally printed and the time it was scanned back.

The raw original image obtained in step S11 may be an image generated from the original digital document or it may be the original digital document itself. For example, if the original digital document is a document generated by a word processing application, the raw original image may be obtained by using a computer program that produces an image representing the original digital document. Or, the original digital document may be printed and immediately scanned back without alteration to obtain the raw original image. Or, the raw original image may be obtained by scanning a hardcopy document that is deemed to be an "original". Other ways of obtaining the raw original image may also be used. The raw original image represents an unaltered image of an original document.

In a case where the raw original and target image are given in an application specific format, e.g., a Microsoft Word format, a PDF format, and so on, they can be converted into bitmap image for further process. In addition, the bitmap images of the raw original and target images are preferably adjusted to be identical in spatial resolution.

It should be noted that in a typical scenario of alteration detection, the raw target image is purported to be a copy of the original document; thus, the raw target image normally has an appearance that generally resemble the original document while the alterations, if present, would be expected to be localized.

The raw original image and raw target image are pre-processed (step S12). Pre-processing includes converting the image from a gray-scale or color image into a binary image by thresholding, if they are not already binary images. The pre-processing steps also include one or more distortion-correction steps, such as deskewing, resizing and registration. Deskew typically refers to correcting a rotational error in the printing and/or scanning process. Many deskew methods are known, such as the Hough transform and Fourier-Mellon transform methods. Some methods use the raw target image only, while others use both the raw target image and the raw original image to perform deskew. Any suitable deskew method may be employed in this step. Similarly, many resizing methods are known. Resizing the raw target image typically requires comparing the raw target image with the raw original image. Some resizing methods compare the effective content areas of the two images. Any suitable resizing method may be employed in this step. Resizing of the raw target image is desirable especially in cases where the raw original and raw target images have different spatial resolutions, such as when the hardcopy document was scanned at a different resolution than the print resolution. The resized raw target image has the same spatial resolution and the same number of pixel as the raw original image, at least in the image area of interest. Registration, which shifts the raw target image, is performed to correctly align the raw target image with respect to the raw original image. It is typically done by comparing the two images. Many image registration methods are known, such as template matching, etc. Any suitable image registration method may be employed in this step. For the raw original image, the distortion-correction steps may be omitted if the image has not been subject to a print and scan process.

The processed original and target images are then compared to detect alterations. To do this, a bounding box is generated for each character in the original and target images (step S13). Each bounding box normally encloses one or more connected groups of pixels of one character. Preferably, the bounding boxes are rectangular. The step of generating bounding boxes for characters is commonly used in OCR (optical character recognition) techniques; any suitable method of generating bounding boxes may be used here in step S13.

The bounding boxes in the original and target images are matched into pairs. A matching pair of bounding boxes is one bounding box from the original image and one bounding box from the target image which have substantially the same locations in the respective images. Here, substantially the same locations means the difference in positions of the two bounding boxes in the respective image is less than predetermined threshold values in the horizontal and vertical directions. The threshold value may be measured in inches or pixels (in which case the value would be dependent on the image resolution). The value of the threshold may depend on various factors. Further, dynamic threshold values may be used. For example, the threshold may be one half of the average width and height of the characters in the relevant line of text for horizontal and vertical threshold values, respectively. In another example, the threshold values are the average distance of the neighboring bounding boxes in the relevant line. If a bounding box in one image does not have a matching bounding box in the other image, then an alteration, e.g., a deletion or addition of a character, is detected (step S14).

FIG. 3a illustrates an exemplary pair of bounding boxes each containing a character "y".

Then, the matching pairs of bounding boxes in the original and target images are processed, where the shape features of the characters of the bounding boxes are compares to determine whether the pairs of characters are the same characters (step S15). The process of step S15 is explained further with reference to FIG. 2.

It should be noted that while the process of FIG. 2 is described here as a step within the overall alteration detection process of FIG. 2, the algorithm shown in FIG. 2 can be applied more generally in other practical applications, and can be used to compare two characters to determine whether they are the same characters.

As shown in FIG. 2, for each pair of matching bounding boxes, the following shape features are calculated for each bounding box:

The Euler number of the character (step S21). The Euler number (an integer) is a measure of the topology of an image. It is defined as $$E = C - H,$$

where E is the Euler number, C is the number of connected image components in the image and H is the number of holes. The Euler number for English letters and Arabic numerals is typically 1, 0 or −1. Any suitable algorithms for calculating the Euler number of the character may be used for this step.

The aspect ratio of the bounding box (step S22). For a rectangular bounding box, the aspect ratio may be defined as the height to width ratio. Other measures may be used if the bounding box has other shapes, such as a parallelogram.

The pixel density of the bounding box (step S23). This is defined as the number of pixels belonging to the character (sometimes referred to as the foreground pixels) divided by the total number of pixels of the bounding box, e.g. the height times the width (in pixels) of the bounding box if it is rectangular.

In addition, the Hausdorff distance between the two characters is calculated (step S24). This step is achieved by first obtaining the skeleton of each of the two characters. The skeleton of a character is the median or center lines of the character. FIG. 3b depicts two the skeletons obtained from the two characters shown in FIG. 3a. The skeleton may be obtained by using a morphological thinning algorithm. Then the Hausdorff distance between the two skeletons of the two characters is calculated. In mathematics, Hausdorff distance is the maximum distance of a set to the nearest point in the other set. More formally, Hausdorff distance from set A to set B is a maximum function, defined as $$H(A,B) = \max\{h(A,B), h(B,A)\}$$

where $$h(A, B) = \max_{a \in A}\left\{\min_{b \in B}\{d(a, b)\}\right\}$$

and $$h(B, A) = \max_{a \in B}\left\{\min_{a \in A}\{d(b, a)\}\right\}$$

where a and b are points of sets A and B respectively, and d(a, b) is any metric between these points; for example, d(a, b) may be the Euclidian distance between a and b. Hausdorff distance is widely used in computer vision, computer graphics and other fields. Any suitable algorithm may be used to calculate the Hausdorff distance between the two skeletons.

Then, decisions are made to determine whether the two characters are the same. In a preferred embodiment, the two characters are determined to be the same if they satisfy all of the following four conditions:

The Euler numbers for the two characters are equal (step S25).

The difference between the two aspect ratios is smaller than a first predefined threshold (step S26).

The difference between the two pixel densities is smaller than a second predefined threshold (step S27).

The Hausdorff distance between the two characters is smaller than a third predefined threshold (step S28).

The thresholds used in these conditions can be pre-set by statistic analysis beforehand. In the preferred embodiment, the three predefined threshold values for the above conditions (steps S26, S27, S28) are approximately 0.1, 0.2, and 5.5 (measured in pixels, for 600 dpi images), respectively. However, any other suitable values may be used. In particular, the threshold for the Hausdorff distance is dependent on image resolution. In an alternative embodiment, the threshold value for the Hausdorff distance is a distance normalized by the size of the character (character width, character height or a combination of the two). In a preferred embodiment, the normalized threshold is 0.2.

If all of the four conditions above are satisfied ("Y" in all of steps S25 to S28), the two characters are determined to be the same (step S29). If any of the conditions is not satisfied ("N" in any of steps S25 to S28), the two characters are determined to be different characters (step S30). The process (steps S21 to S30) is repeated for all matching pairs of bounding boxes in the original and target images.

It should be noted that although FIG. 2 depicts four calculation steps (S21 to S24) and four determination steps (S25 to S28), the order of the steps may vary from that depicted in FIG. 2. For example, each determination step can be performed immediately after the corresponding calculation step; if one of the determination steps fails, the two characters are determined to be different (step S30) and the remaining calculation and determination steps (if any) are skipped.

Further, although in the embodiment of FIG. 2 all four conditions must be satisfied for the two characters to be considered the same, it is possible to relax the conditions. For example, in an alternative embodiment, the two characters are determined to be the same if at least three of the four conditions (expressed in steps S25 to S28) are satisfied. In another alternative, the two characters are determined to be the same if the Hausdorff distance condition (step S28) is satisfied and at least two of the other three conditions (steps S25 to S27) are satisfied. In this regard, it can be said that each of the four conditions is insufficient in many practical circumstances to determine whether the matching two characters are the same or not, if such condition is used alone. From practical experiments, the inventors found that a combination of the Euler number condition and Hausdorff distance condition reduces a percentage of false determination. It is believed that the determination accuracy of the Hausdorff distance condition can be compensated by combining the same with the Euler number condition, because the Hausdorff distance condition highly depends on the algorithm how to extract the skeletons of the matching characters, and performs relatively low accuracy in cases where the quality of compared images are low. However, other combinations may also be used.

After all the matching pairs of bounding boxes are processed ("Return" in FIG. 2), all alterations detected in step S14 and all alterations detected in step S15 (i.e. FIG. 2) are combined to generate a representation of the alteration detection result, referred to as an alteration map for convenience, which may then be displayed to a user, printed, stored, etc. (step S16 in FIG. 1).

The alteration map may have any suitable format as long as it can indicate the alterations (differences) between the original and target images. For example, the alteration map may be a binary difference map indicating which pixels are different between the two images. In such a map, unaltered areas will be blank, and altered areas will appear on the map. As another example, the alteration map may be a marked-up version of the original image or a marked-up version of the target image, with markers or highlights (such as boxes, circles, lines, arrows, colors, etc.) to indicate parts of the image that are altered (added, deleted, changed, etc.). The added or delete characters may be indicated by a marker with or without showing the characters. Different colors may be used in the alteration map to indicate different types of alterations (additions, deletions, changes, etc.). In another example, the alteration map may include only markers indicating the location of the alterations without including any characters.

The shape feature comparison process described above (FIG. 2) can be used to compare any characters in any language. As pointed out earlier, for the purpose of this comparison, it is not necessary to actually recognize the characters as is the case in an OCR process.

The alteration detection method described above may be implemented by software or firmware stored in a memory and executed by any suitable data processing apparatus, such as a computer, a printer or scanner having a data processing section, etc. In this regard, computer executable software, which is codes for realizing the flowchart of FIG. 1, may be stored in a computer memory accessed by a central processing unit (CPU) or a micro processing unit (MPU) of the suitable data processing apparatus. The printing and scanning steps may be performed by any printer and scanner, or an all-in-one device that combines a printing section and scanning section in a single device. The structures of these devices and apparatuses are well known and not described in detail here.

Although the method above, in particular the algorithm of FIG. 2, is described in the context of document alteration detection, the algorithm may be more generally used as a method of comparing two characters to determine whether they are the same characters.

It will be apparent to those skilled in the art that various modification and variations can be made in the alteration detection method of the present invention without departing from the spirit or scope of the invention. Thus, it is intended that the present invention cover modifications and variations that come within the scope of the appended claims and their equivalents.

What is claimed is:

1. A method implemented in a data processing apparatus for detecting alterations between an original image and a target image, the original and target images being binary bitmap images, the method comprising:
   (a) defining a plurality of bounding boxes in the original image and the target image, each bounding box enclosing one or more connected groups of pixels of one character;
   (b) identifying a plurality of matching pairs of bounding boxes in the original image and the target image, wherein each matching pair of the bounding boxes have substantially the same locations in the original image and the target image, respectively;
   (c) for each matching pair of bounding boxes:
      (c1) calculating a plurality of shape features including (1) a Euler number of each of the pair of characters enclosed by the pair of bounding boxes, and (2) a Hausdorff distance between the pair of characters; and
      (c2) determining whether the pair of characters enclosed by the pair of bounding boxes are the same character or different characters by evaluating (1) whether the Euler numbers of the pair of characters are equal, and (2) whether the Hausdorff distance between the pair of characters is smaller than a first predefined threshold.

2. The method of claim 1, wherein step (c2) comprises:
   determining the pair of characters to be the same character if (1) the Euler numbers of the pair of characters are equal, and (2) the Hausdorff distance between the pair of characters is smaller than the first predefined threshold; and
   otherwise determining the pair of characters to be different characters.

3. The method of claim 1, wherein the first predefined threshold is 0.2 defined as a distance normalized by a size of the character.

4. The method of claim 1, wherein the plurality of shape features calculated in step (c1) further includes (3) an aspect ratio of each of the pair of bounding boxes, and (4) a pixel density for each of the pair of bounding boxes, wherein a pixel density of a bounding box is defined as a number of pixels belonging to the character of the bounding box divided by a total number of pixels of the bounding box, and
   wherein step (c2) is performed by further evaluating (3) whether a difference between the aspect ratios of the pair of bounding boxes is smaller than a second predefined threshold, and (4) whether a difference between the pixel densities of the pair of bounding boxes is smaller than a third predefined threshold.

5. The method of claim 4, wherein step (c2) comprises:
   determining the pair of characters to be the same character if (1) the Euler numbers of the pair of characters are equal, (2) the Hausdorff distance between the pair of characters is smaller than the first predefined threshold, (3) the difference between the aspect ratios of the pair of bounding boxes is smaller than the second predefined threshold, and (4) the difference between the pixel densities of the pair of bounding boxes is smaller than the third predefined threshold; and
   otherwise determining the pair of characters to be different characters.

6. The method of claim 4, wherein the first predefined threshold is 0.2 defined as a distance normalized by a size of the character, the second predefined threshold is 0.1, and the third predefined threshold is 0.2.

7. The method of claim 1, wherein the Hausdorff distance between the pair of characters is calculated by obtaining two skeletons, one for each of the pair of characters, and calculating a Hausdorff distance between the two skeletons.

8. The method of claim 1, wherein the bounding boxes are rectangular.

9. The method of claim 1, further comprising:
generating a representation of alteration detection result based on the determinations in step (c2).

10. The method of claim 1, further comprising, after step (a):
(d) identifying any bounding box in one of the original and target images that lacks a matching bounding box in the other one of the original and target images.

11. The method of claim 10, further comprising:
generating a representation of alteration detection result based on the determinations in step (c2) and any bounding box identified in step (d).

12. A computer program product comprising a computer usable non-transitory medium having a computer readable program code embedded therein for controlling a data processing apparatus, the computer readable program code configured to cause the data processing apparatus to execute a process for detecting alterations between an original image and a target image, the original and target images being binary bitmap images, wherein the process comprises:
(a) defining a plurality of bounding boxes in the original image and the target image, each bounding box enclosing one or more connected groups of pixels of one character;
(b) identifying a plurality of matching pairs of bounding boxes in the original image and the target image, wherein each matching pair of the bounding boxes have substantially the same locations in the original image and the target image, respectively;
(c) for each matching pair of bounding boxes:
(c1) calculating a plurality of shape features including (1) a Euler number of each of the pair of characters enclosed by the pair of bounding boxes, and (2) a Hausdorff distance between the pair of characters; and
(c2) determining whether the pair of characters enclosed by the pair of bounding boxes are the same character or different characters by evaluating (1) whether the Euler numbers of the pair of characters are equal, and (2) whether the Hausdorff distance between the pair of characters is smaller than a first predefined threshold.

13. The computer program product of claim 12, wherein step (c2) comprises:
determining the pair of characters to be the same character if (1) the Euler numbers of the pair of characters are equal, and (2) the Hausdorff distance between the pair of characters is smaller than the first predefined threshold; and
otherwise determining the pair of characters to be different characters.

14. The computer program product of claim 12, wherein the first predefined threshold is 0.2 defined as a distance normalized by a size of the character.

15. The computer program product of claim 12, wherein the plurality of shape features calculated in step (c1) further includes (3) an aspect ratio of each of the pair of bounding boxes, and (4) a pixel density for each of the pair of bounding boxes, wherein a pixel density of a bounding box is defined as a number of pixels belonging to the character of the bounding box divided by a total number of pixels of the bounding box, and
wherein step (c2) is performed by further evaluating (3) whether a difference between the aspect ratios of the pair of bounding boxes is smaller than a second predefined threshold, and (4) whether a difference between the pixel densities of the pair of bounding boxes is smaller than a third predefined threshold.

16. The computer program product of claim 15, wherein step (c2) comprises:
determining the pair of characters to be the same character if (1) the Euler numbers of the pair of characters are equal, (2) the Hausdorff distance between the pair of characters is smaller than the first predefined threshold, (3) the difference between the aspect ratios of the pair of bounding boxes is smaller than the second predefined threshold, and (4) the difference between the pixel densities of the pair of bounding boxes is smaller than the third predefined threshold; and
otherwise determining the pair of characters to be different characters.

17. The computer program product of claim 15, wherein the first predefined threshold is 0.2 defined as a distance normalized by a size of the character, the second predefined threshold is 0.1, and the third predefined threshold is 0.2.

18. The computer program product of claim 12, wherein the Hausdorff distance between the pair of characters is calculated by obtaining two skeletons, one for each of the pair of characters, and calculating a Hausdorff distance between the two skeletons.

19. The computer program product of claim 12, wherein the bounding boxes are rectangular.

20. The computer program product of claim 12, wherein the process further comprises:
generating a representation of alteration detection result based on the determinations in step (c2).

21. The computer program product of claim 12, therein the process further comprises, after step (a):
(d) identifying any bounding box in one of the original and target images that lacks a matching bounding box in the other one of the original and target images.

22. The computer program product of claim 21, wherein the process further comprises:
generating a representation of alteration detection result based on the determinations in step (c2) and any bounding box identified in step (d).

23. A method implemented in a data processing apparatus for comparing two characters in an original image and a target image, respectively, the original and target images being binary bitmap images, each character being one or more connected groups of pixels enclosed in a respective bounding box, the method comprising:
calculating a plurality of shape features including (1) a Euler number of each of the pair of characters enclosed by the pair of bounding boxes, and (2) a Hausdorff distance between the pair of characters; and
determining whether the pair of characters enclosed by the pair of bounding boxes are the same character or different characters by evaluating (1) whether the Euler numbers of the pair of characters are equal, and (2) whether the Hausdorff distance between the pair of characters is smaller than a first predefined threshold.

24. The method of claim 23, wherein the determining step comprises:
    determining the pair of characters to be the same character if (1) the Euler numbers of the pair of characters are equal, and (2) the Hausdorff distance between the pair of characters is smaller than the first predefined threshold; and
    otherwise determining the pair of characters to be different characters.

25. The method of claim 23, wherein the first predefined threshold is 0.2 defined as a distance normalized by a size of the character.

26. The method of claim 23, wherein the plurality of shape features calculated in the calculating step further includes (3) an aspect ratio of each of the pair of bounding boxes, and (4) a pixel density for each of the pair of bounding boxes, wherein a pixel density of a bounding box is defined as a number of pixels belonging to the character of the bounding box divided by a total number of pixels of the bounding box, and
    wherein the determining step is performed by further evaluating (3) whether a difference between the aspect ratios of the pair of bounding boxes is smaller than a second predefined threshold, and (4) whether a difference between the pixel densities of the pair of bounding boxes is smaller than a third predefined threshold.

27. The method of claim 26, wherein the determining step comprises:
    determining the pair of characters to be the same character if (1) the Euler numbers of the pair of characters are equal, (2) the Hausdorff distance between the pair of characters is smaller than the first predefined threshold, (3) the difference between the aspect ratios of the pair of bounding boxes is smaller than the second predefined threshold, and (4) the difference between the pixel densities of the pair of bounding boxes is smaller than the third predefined threshold; and
    otherwise determining the pair of characters to be different characters.

28. The method of claim 26, wherein the first predefined threshold is 0.2 defined as a distance normalized by a size of the character, the second predefined threshold is 0.1, and the third predefined threshold is 0.2.

29. The method of claim 23, wherein the Hausdorff distance between the pair of characters is calculated by obtaining two skeletons, one for each of the pair of characters, and calculating a Hausdorff distance between the two skeletons.

30. The method of claim 23, wherein the bounding boxes are rectangular.

31. A computer program product comprising a computer usable non-transitory medium having a computer readable program code embedded therein for controlling a data processing apparatus, the computer readable program code configured to cause the data processing apparatus to execute a process for comparing two characters in an original image and a target image, respectively, the original and target images being binary bitmap images, each character being one or more connected groups of pixels enclosed in a respective bounding box, wherein the process comprises:
    calculating a plurality of shape features including (1) a Euler number of each of the pair of characters enclosed by the pair of bounding boxes, and (2) a Hausdorff distance between the pair of characters; and
    determining whether the pair of characters enclosed by the pair of bounding boxes are the same character or different characters by evaluating (1) whether the Euler numbers of the pair of characters are equal, and (2) whether the Hausdorff distance between the pair of characters is smaller than a first predefined threshold.

32. The computer program product of claim 31, wherein the determining step comprises:
    determining the pair of characters to be the same character if (1) the Euler numbers of the pair of characters are equal, and (2) the Hausdorff distance between the pair of characters is smaller than the first predefined threshold; and
    otherwise determining the pair of characters to be different characters.

33. The computer program product of claim 31, wherein the first predefined threshold is 0.2 defined as a distance normalized by a size of the character.

34. The computer program product of claim 31, wherein the plurality of shape features calculated in the calculating step further includes (3) an aspect ratio of each of the pair of bounding boxes, and (4) a pixel density for each of the pair of bounding boxes, wherein a pixel density of a bounding box is defined as a number of pixels belonging to the character of the bounding box divided by a total number of pixels of the bounding box, and
    wherein the determining step is performed by further evaluating (3) whether a difference between the aspect ratios of the pair of bounding boxes is smaller than a second predefined threshold, and (4) whether a difference between the pixel densities of the pair of bounding boxes is smaller than a third predefined threshold.

35. The computer program product of claim 34, wherein the determining step comprises:
    determining the pair of characters to be the same character if (1) the Euler numbers of the pair of characters are equal, (4) the Hausdorff distance between the pair of characters is smaller than the first predefined threshold, (3) the difference between the aspect ratios of the pair of bounding boxes is smaller than the second predefined threshold, and (4) the difference between the pixel densities of the pair of bounding boxes is smaller than the third predefined threshold; and
    otherwise determining the pair of characters to be different characters.

36. The computer program product of claim 34, wherein the first predefined threshold is 0.2 defined as a distance normalized by a size of the character, the second predefined threshold is 0.1, and the third predefined threshold is 0.2.

37. The computer program product of claim 31, wherein the Hausdorff distance between the pair of characters is calculated by obtaining two skeletons, one for each of the pair of characters, and calculating a Hausdorff distance between the two skeletons.

38. The computer program product of claim 31, wherein the bounding boxes are rectangular.

* * * * *